(12) United States Patent
Hergeth

(10) Patent No.: US 9,540,748 B2
(45) Date of Patent: Jan. 10, 2017

(54) METHOD AND APPARATUS FOR SEPARATING SEWING THREADS AND CARBON FIBERS

(71) Applicant: Hubert Hergeth, Zug (CH)

(72) Inventor: Hubert Hergeth, Zug (CH)

(73) Assignee: Hubert Hergeth, Zug (CH)

( * ) Notice: Subject to any disclaimer, the term of this patent is extended or adjusted under 35 U.S.C. 154(b) by 249 days.

(21) Appl. No.: 14/137,061

(22) Filed: Dec. 20, 2013

(65) Prior Publication Data

US 2014/0173854 A1   Jun. 26, 2014

(30) Foreign Application Priority Data

Dec. 26, 2012 (DE) .................. 10 2012 025 181

(51) Int. Cl.
*D01G 11/00* (2006.01)
*D01G 15/84* (2006.01)

(52) U.S. Cl.
CPC ............... *D01G 11/00* (2013.01); *D01G 15/84* (2013.01); *Y02W 30/66* (2015.05)

(58) Field of Classification Search
CPC ......... D01G 11/00; D01G 11/04; Y02W 30/66
See application file for complete search history.

(56) References Cited

U.S. PATENT DOCUMENTS

| | | | | |
|---|---|---|---|---|
| 3,983,273 A * | 9/1976 | Elliott | ............... | D01G 15/26 19/106 R |
| 4,115,903 A * | 9/1978 | Barber | ............... | D01G 15/02 19/0.2 |
| 4,534,086 A * | 8/1985 | Fehrer | ............... | D01G 25/00 19/145.7 |
| 5,626,237 A * | 5/1997 | Hergeth | ............... | B07C 5/342 209/580 |
| 5,692,622 A * | 12/1997 | Hergeth | ............... | B07C 5/342 209/580 |
| 5,974,628 A * | 11/1999 | Giuliani | ............... | D01G 15/26 19/102 |
| 2013/0192189 A1* | 8/2013 | Lawrence | ............... | D02G 3/16 57/244 |
| 2013/0192434 A1* | 8/2013 | Hashimoto | ............... | B29B 11/16 83/13 |
| 2013/0196154 A1* | 8/2013 | Ortlepp | ............... | B29B 9/04 428/357 |
| 2013/0210298 A1* | 8/2013 | Ortlepp | ............... | B29B 11/16 442/1 |

FOREIGN PATENT DOCUMENTS

| | | |
|---|---|---|
| DE | 102009023529 | 12/2010 |
| EP | 01438449 A2 | 7/2004 |

* cited by examiner

*Primary Examiner* — Shaun R Hurley
(74) *Attorney, Agent, or Firm* — Lowe Graham Jones PLLC

(57) ABSTRACT

A method and an apparatus for separating sewing threads from pieces of carbon fiber mats or bundles of carbon fibers using rollers covered with card clothing. The mat pieces or fiber agglomerates are broken up and separated using the different mechanical properties of the fibers.

13 Claims, 2 Drawing Sheets

METHOD AND APPARATUS FOR SEPARATING SEWING THREADS AND CARBON FIBERS

PRIORITY CLAIM

This application claims priority to German application serial number 10 2012 025 181.5 filed on Dec. 26, 2012, which is hereby incorporated by reference in its entirety.

FIELD OF THE INVENTION

The present invention relates to a method and an apparatus for separating sewing threads and carbon fibres.

BACKGROUND

When carbon fibre mats are processed into formed parts, sewing threads are used to fix the mats. When the formed parts are trimmed, material pieces are generated which are not processed any further, but are recycled. During reprocessing, the sewing threads constitute an obstacle since they act as "predetermined breaking points". On account of the sewing threads, these recycled fibres can only be used for applications of minor importance and are thus of little value. The sewing threads, i.e. also the connecting threads, do not consist of the same material as the carbon fibres of the mats.

It is obvious to use an optical sorter, e.g. CUBiSCAN, to sort out sewing threads having a different colour than carbon from a fibre and air stream. The drawback of this is that the recycled parts must be torn into small pieces. The threads are not detected and removed entirely.

DETAILED DESCRIPTION

It is an object of the invention to provide a possibility for gently separating, to the fullest extent possible, the sewing threads from the carbon mats so as to recover the carbon fibres without damaging them and to provide carbon fibres free of sewing threads.

According to the invention, this is accomplished by a method and an apparatus, described herein, which do not make use of the colour of the sewing threads (white) as opposed to that of the carbon fibres (black), but rather of the different mechanical properties of sewing threads and carbon fibres, particularly stiffness and surface structure.

The invention will now be explained with reference to FIGS. 1 and 2.

Figure 1:
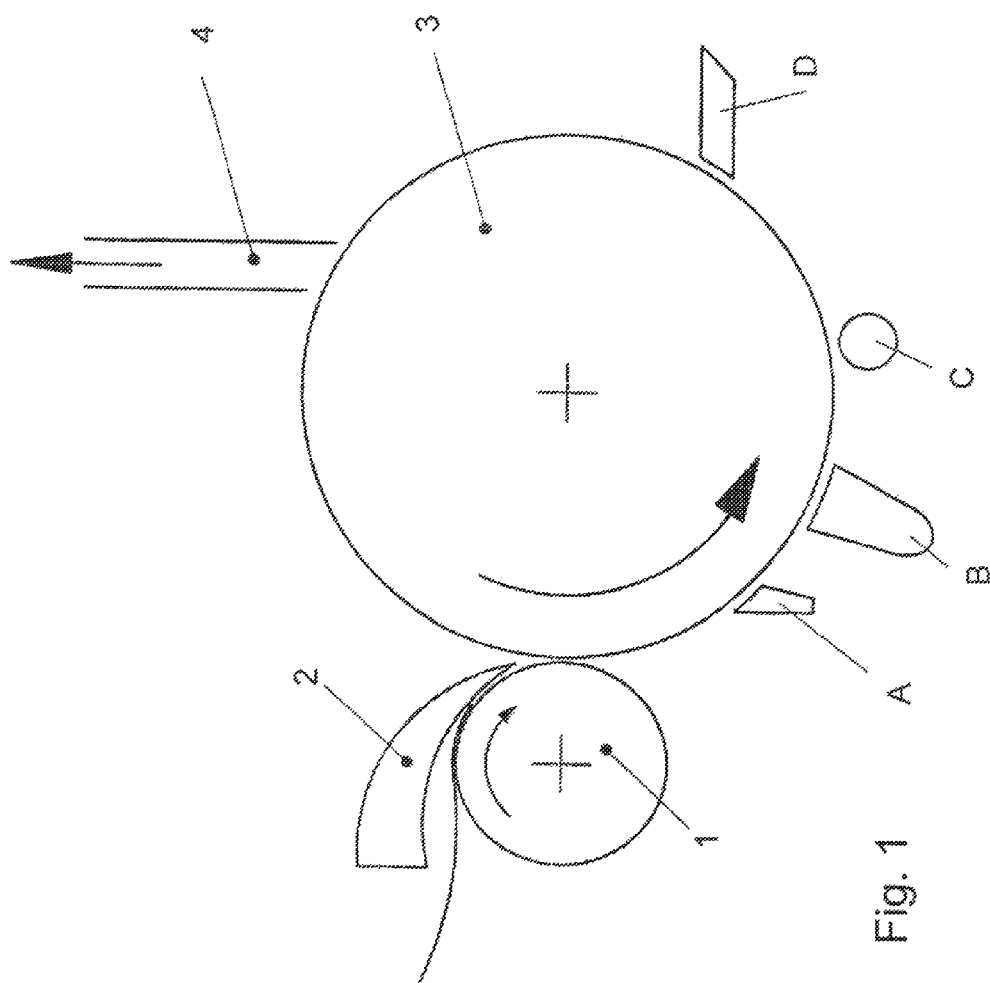
FIG. 1 is a an schematic apparatus for separating sewing threads and carbon fibres according to an embodiment of the present invention.

FIG. 1 shows an apparatus according to the invention for separating sewing threads and carbon fibres, comprising a roller 3) covered with card clothing (not shown) around its circumference. Via a taker-in roller 1) and a guiding member 2), carbon fibre mat pieces are fed to the faster turning roller 3). As a result, the mat pieces are broken up. The parts that are still unbroken are held on the roller by means of shaping members A, B, C. Carbon fibres are ejected in unconfined areas or at unconfined edges (e.g., D).

The carbon fibres can be collected in a collection chamber or drawn off by suction. Once the carbon fibres have been ejected, the card clothing is cleared from sewing threads adhering thereto by applying suction. A suction means is shown under 4). Once the sewing threads have been removed by applying suction, new carbon mat pieces can be fed in.

Figure 2:
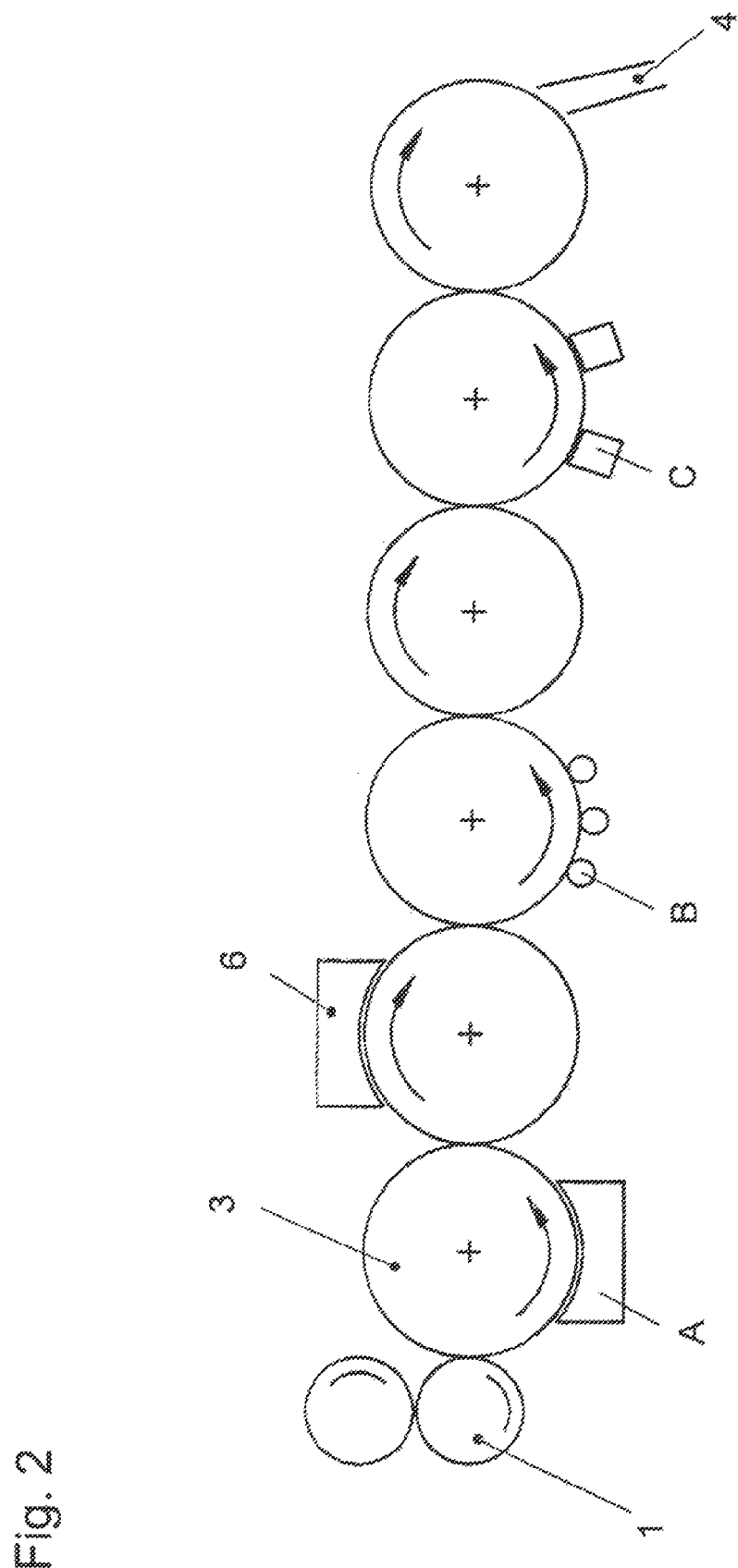
FIG. 2 is a schematic system for separating sewing threads and carbon fibres according to another embodiment of the present invention.

FIG. 2 shows another embodiment comprising several rollers covered with card clothing (which operate in succession). The fibre mat sections and fibres interspersed with sewing threads are fed in through a taker-in device 1) made up of two feed cylinders of the first roller 3) covered with card clothing. The carbon fibres and sewing threads are transferred from one roller to the next and are further broken up as a result of this transfer and by the action of the carding elements 6). Carbon fibres isolated from the fibre mats fall down into the collection area by gravity and are conveyed away. Carbon fibres that have not yet been isolated and those sewing threads which adhere more readily to the card clothing on account of their rougher surface and their greater flexibility are passed to the next roller turning at a higher surface speed. What remains on the last roller is almost exclusively sewing threads which are continuously conveyed away from the roller by a suction device 4) or a doffing device.

Sewing threads and expensive carbon fibres can be gently and highly reliably separated in the manner described above.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for separating sewing threads and carbon fibres, the method comprising:
    feeding recycled carbon fibre mat pieces onto a first roller, wherein the recycled carbon fibre mat pieces include carbon fibre mats, pieces of carbon fibre mats, or carbon fibre agglomerates interspersed with sewing threads;
    urging the recycled carbon mat pieces through an interface between the first roller and an second roller, wherein the second roller includes a second roller surface covered with card cloth;
    within the interface, breaking up the recycled carbon fibre mat pieces into carbon fibres and carbon fibre bundles;
    isolating at least some of the carbon fibres and carbon fibre bundles from the sewing threads; and
    while moving along the second roller surface, removing at least some of the carbon fibres and carbon fibre bundles from the second roller surface while at least some of the sewing threads remain on at least one of the first or second rollers.

2. The method according to claim 1, wherein the carbon fibres and carbon fibre bundles are carried along by the second roller until at least 90 percent of the carbon fibres have detached from the second roller.

3. The method according to claim 1, wherein the second roller turns at a higher surface speed than the first roller.

4. The method according to claim 1, further comprising transferring the carbon fibres, carbon fibre bundles and sewing threads from the second roller to one or more rollers, wherein each successive of the one or more rollers turns at a higher surface speed than the previous roller.

5. The method according to claim 1, wherein the removing at least some of the carbon fibres includes removing the at least some of the carbon fibres from the group of removal methods consisting of gravity removal, centrifugal force removal, air flow removal, electrostatic field removal, and scraping removal.

6. The method according to claim 1, further comprising carding rollers or carding members provided opposite at least one of the first or second roller surfaces.

7. An apparatus for separating sewing threads and carbon fibres, the apparatus comprising:
a first turning roller covered with card clothing for breaking up carbon fibre mats, carbon fibre mat pieces or carbon fibre agglomerates interspersed with sewing threads into carbon fibres and carbon fibre bundles;
a plurality of additional turning rollers laterally arranged with respect to the first turning roller, each of the plurality of additional turning rollers covered with card clothing, wherein each successive turning roller of the plurality of additional turning rollers operates at with a higher surface speed as compared to a preceding turning roller of the plurality of additional turning rollers; and
a mechanism operable to remove at least some of the carbon fibres and carbon fibre bundles from at least the first turning roller or one of the successive turning rollers before the carbon fibres and carbon fibre bundles reach a final one of the plurality of turning rollers, wherein at least one of the successive turning rollers are uncovered and exposed during use to the environment to allow for intermediate fibre removal.

8. The apparatus according to claim 7, wherein the carbon fibres and sewing threads are transferred from the preceding turning roller to the successive turning roller.

9. The apparatus according to claim 8, wherein the plurality of additional turning rollers includes at least six turning.

10. The apparatus according to claim 7, wherein the card clothing of the at least one of the turning rollers includes saw-tooth wires or flexible wires, flexibly mounted wires, or profiles.

11. The apparatus according to claim 7, wherein the mechanism operable to remove at least some of the carbon fibres and carbon fibre bundles includes a suction device.

12. The apparatus according to claim 7, wherein the mechanism operable to remove at least some of the carbon fibres and carbon fibre bundles includes a comb or a system of take-off rollers.

13. The apparatus according to claim 7, wherein the mechanism operable to remove at least some of the carbon fibres and carbon fibre bundles from the card clothing of at least one of the turning rollers includes a mechanism from the group of removal methods consisting of an air flow mechanism, an electrostatic field and one or more shaping members that extend across a width of at least one of the turning rollers.

* * * * *